United States Patent
Walker et al.

(10) Patent No.: US 6,792,103 B1
(45) Date of Patent: Sep. 14, 2004

(54) TELEPHONIC AUTOMATIC DIALING SYSTEM

(76) Inventors: James H. Walker, 854 Braemar Dr., Mundelein, IL (US) 60060-1319; Patrick Sutterfield, 3535 S. 122nd Ct., Greenfield, WI (US) 53228

( * ) Notice: Subject to any disclaimer, the term of this patent is extended or adjusted under 35 U.S.C. 154(b) by 0 days.

(21) Appl. No.: 09/296,321

(22) Filed: Apr. 22, 1999

(51) Int. Cl.[7] .............................. H04M 1/00; H04M 3/00
(52) U.S. Cl. ...................... 379/352; 398/128; 398/135; 455/556.2; 379/355.03
(58) Field of Search .......................... 379/352, 357.04, 379/45, 40, 157, 357.01, 372.02, 372, 355.03; 375/354; 370/352; 455/403, 186.1, 556.2; 380/247; 398/128, 130, 135; 340/870.28

(56) References Cited

U.S. PATENT DOCUMENTS

| | | | | |
|---|---|---|---|---|
| 4,191,849 A | * | 3/1980 | Vrba | 375/354 |
| 4,266,102 A | * | 5/1981 | Stanley et al. | 379/157 |
| 4,267,603 A | * | 5/1981 | Osakabe et al. | 455/186.1 |
| 4,493,947 A | * | 1/1985 | Loveless | 379/40 |
| 5,495,525 A | * | 2/1996 | Walker et al. | 379/357.04 |
| 5,592,555 A | * | 1/1997 | Stewart | 380/247 |
| 5,636,264 A | * | 6/1997 | Sulavuori et al. | 359/113 |
| 5,790,644 A | * | 8/1998 | Kikinis | 379/114.19 |
| 5,797,089 A | * | 8/1998 | Nguyen | 455/403 |
| 6,018,580 A | * | 1/2000 | Nellessen | 379/357.04 |
| 6,337,856 B1 | * | 1/2002 | Schanhals et al. | 370/352 |

* cited by examiner

Primary Examiner—Minsun Oh Harvey
Assistant Examiner—Con P. Tran

(57) ABSTRACT

A system is provided for automatically dialing a number stored in an electronic organizer on a telephone. The system comprises an electronic organizer including memory for storing a plurality of telephone numbers therein, an input device for selecting one of the telephone numbers, and a communicator for transmitting digits of the selected telephone number. The system further includes telephone circuitry adapted to dial digits of the selected telephone number upon the receipt thereof. Further provided is an interface including a communicator in communication with the communicator of the electronic organizer for receiving the digits therefrom and transmitting the same to the telephone circuitry.

7 Claims, 4 Drawing Sheets

Resetting of the 74HC4024 Seven Stage Binary Ripple Counter

TELEPHONIC AUTOMATIC DIALING SYSTEM

BACKGROUND OF THE INVENTION

1. Field of the Invention

The present invention relates to electronic organizers and more particularly pertains to a new telephonic automatic dialing sytem for automatically dialing a number stored on an electronic organizer.

2. Description of the Prior Art

The use of electronic organizers is known in the prior art. More specifically, electronic organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,337,346; U.S. Pat. No. 5,204,894; U.S. Pat. No. 4,117,542; U.S. Pat. Des. 339,139; U.S. Pat. Des. 293,101; and U.S. Pat. No. 4,450,319.

In these respects, the telephonic automatic dialing sytem according to the present invention substantially departs from the conventional concepts and designs of the prior art, and in so doing provides an apparatus primarily developed for the purpose of automatically dialing a number stored on an electronic organizer.

SUMMARY OF THE INVENTION

In view of the foregoing disadvantages inherent in the known types of electronic organizers now present in the prior art, the present invention provides a new telephonic automatic dialing sytem construction wherein the same can be utilized for automatically dialing a number stored on an electronic organizer.

The general purpose of the present invention, which will be described subsequently in greater detail, is to provide a new telephonic automatic dialing sytem apparatus and method which has many of the advantages of the electronic organizers mentioned heretofore and many novel features that result in a new telephonic automatic dialing sytem which is not anticipated, rendered obvious, suggested, or even implied by any of the prior art electronic organizers, either alone or in any combination thereof.

To attain this, the present invention generally comprises a system for automatically dialing a number stored on a portable electronic organizer on a telephone, the system including a portable electronic organizer including: memory for storing a plurality of telephone numbers therein, a keypad for selecting one of the telephone numbers, an infrared transceiver for transmitting digits of the selected telephone number via free space upon the receipt thereof, the infrared transceiver further adapted to receive a prompting signal via free space, and control circuitry connected between the memory, the keypad, and the infrared transceiver, the control circuitry adapted to transmit the digits of the selected telephone number to the infrared transceiver sequentially one at a time only upon receipt of the prompting signal via the infrared transceiver; a telephone adapted to dial digits of the selected telephone number upon the receipt thereof; and an interface including a housing with adhesive situated thereon for adhering to the telephone, an input for releasably connecting to a telephone line, and an output for releasably connecting to the telephone so as to allow the communication between the telephone line and the telephone, the interface further including a plurality of components in the housing thereof including: an infrared transceiver adapted for receiving the digits transmitted via the infrared transceiver of the electronic organizer, the infrared transceiver of the interface further adapted for transmitting the prompt signal via free space upon the receipt thereof, an oscillator for generating a clock signal, a ripple counter connected to the oscillator for dividing the clock signal so as to a generate a divide signal which is high after a predetermined number of cycles of the clock signal, a converter connected to the oscillator, the ripple counter, and the infrared transceiver of the interface for converting each of the digits received via the infrared transceiver of the interface to a binary signal, wherein the binary signal comprises a 4-bit word, the converter further adapted to transmit the prompt signal to the infrared transceiver of the interface upon the receipt of the divide signal, a universal shift register connected to the ripple counter and the converter for receiving and storing the bits of each binary signal received from the converter, the universal shift register further adapted to transmit the binary signal upon the receipt of a word signal, a presettable counter connected to the oscillator for generating the word signal upon a sufficient number of cycles of the clock signal occurring so as to indicate the receipt of all 4 bits of the binary signal by the universal shift register, and a dual tone multiple frequency tone generator connected to the universal shift register and the output of the interface for transmitting a tone associated with the digit represented by the binary signal received via the universal shift register, thereby transmitting the digit on the telephone for dialing purposes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephonic automatic dialing sytem apparatus and method which has many of the advantages of the electronic organizers mentioned heretofore and many novel features that result in a new telephonic automatic dialing sytem which is not anticipated, rendered obvious, suggested, or even implied by any of the prior art electronic organizers, either alone or in any combination thereof.

It is another object of the present invention to provide a new telephonic automatic dialing sytem which may be easily and efficiently manufactured and marketed.

It is a further object of the present invention to provide a new telephonic automatic dialing sytem which is of a durable and reliable construction.

An even further object of the present invention is to provide a new telephonic automatic dialing sytem which is susceptible of a low cost of manufacture with regard to both materials and labor, and which accordingly is then susceptible of low prices of sale to the consuming public, thereby making such telephonic automatic dialing sytem economically available to the buying public.

Still yet another object of the present invention is to provide a new telephonic automatic dialing sytem which provides in the apparatuses and methods of the prior art some of the advantages thereof, while simultaneously overcoming some of the disadvantages normally associated therewith.

Still another object of the present invention is to provide a new telephonic automatic dialing sytem for automatically dialing a number stored on an electronic organizer.

Even still another object of the present invention is to provide a new telephonic automatic dialing sytem that includes an electronic organizer including memory for storing a plurality of telephone numbers therein, a keypad for selecting one of the telephone numbers, and a communicator for transmitting digits of the selected telephone number. The system further includes telephone circuitry adapted to dial digits of the selected telephone number upon the receipt thereof. Further provided is an interface including a communicator in communication with the communicator of the electronic organizer for receiving the digits therefrom and transmitting the same to the telephone circuitry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
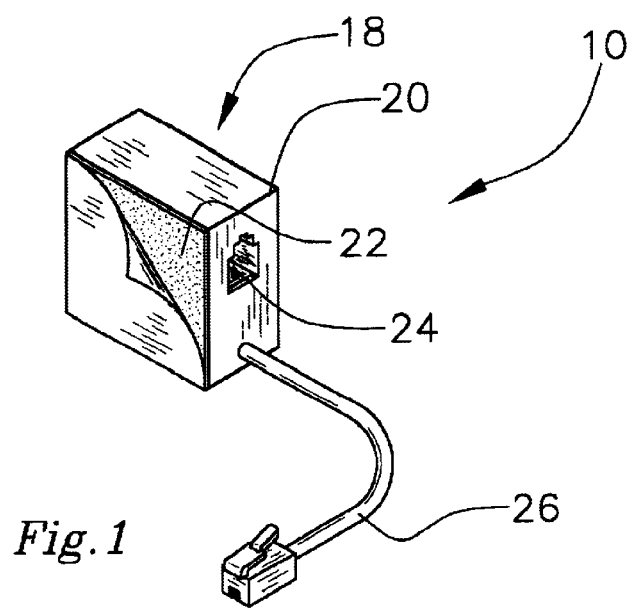
FIG. 1 is a perspective view of a new telephonic automatic dialing sytem according to the present invention.
Figure 2:
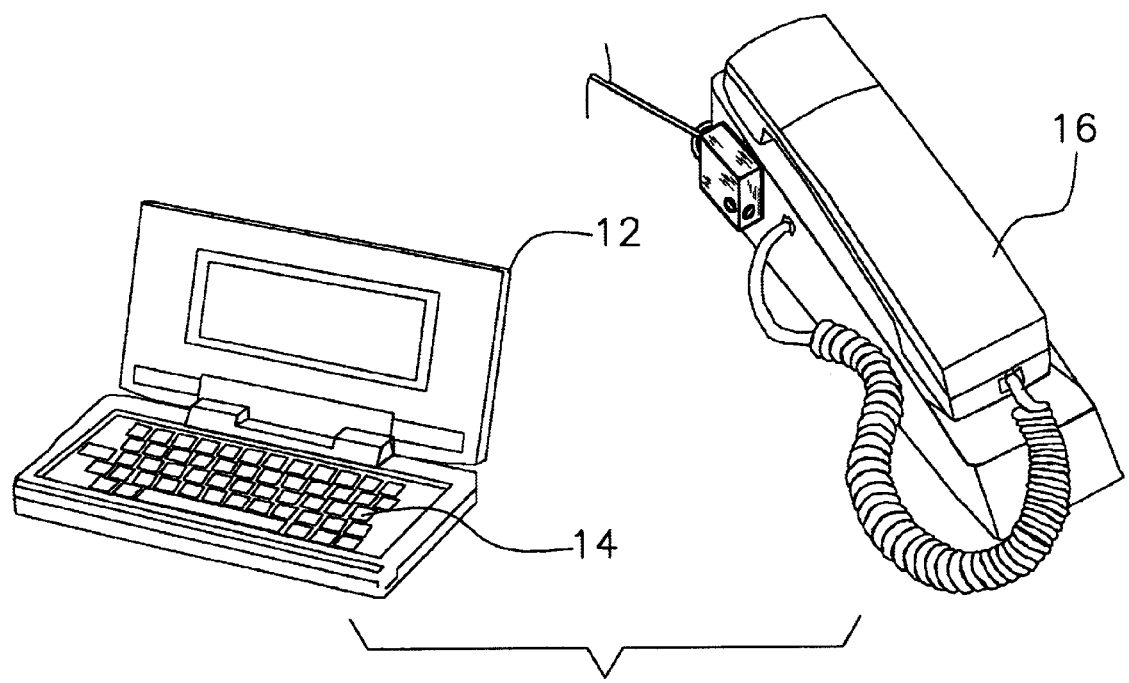
FIG. 2 is an exploded view of the present invention including the electronic organizer and telephone thereof.
Figure 3A:
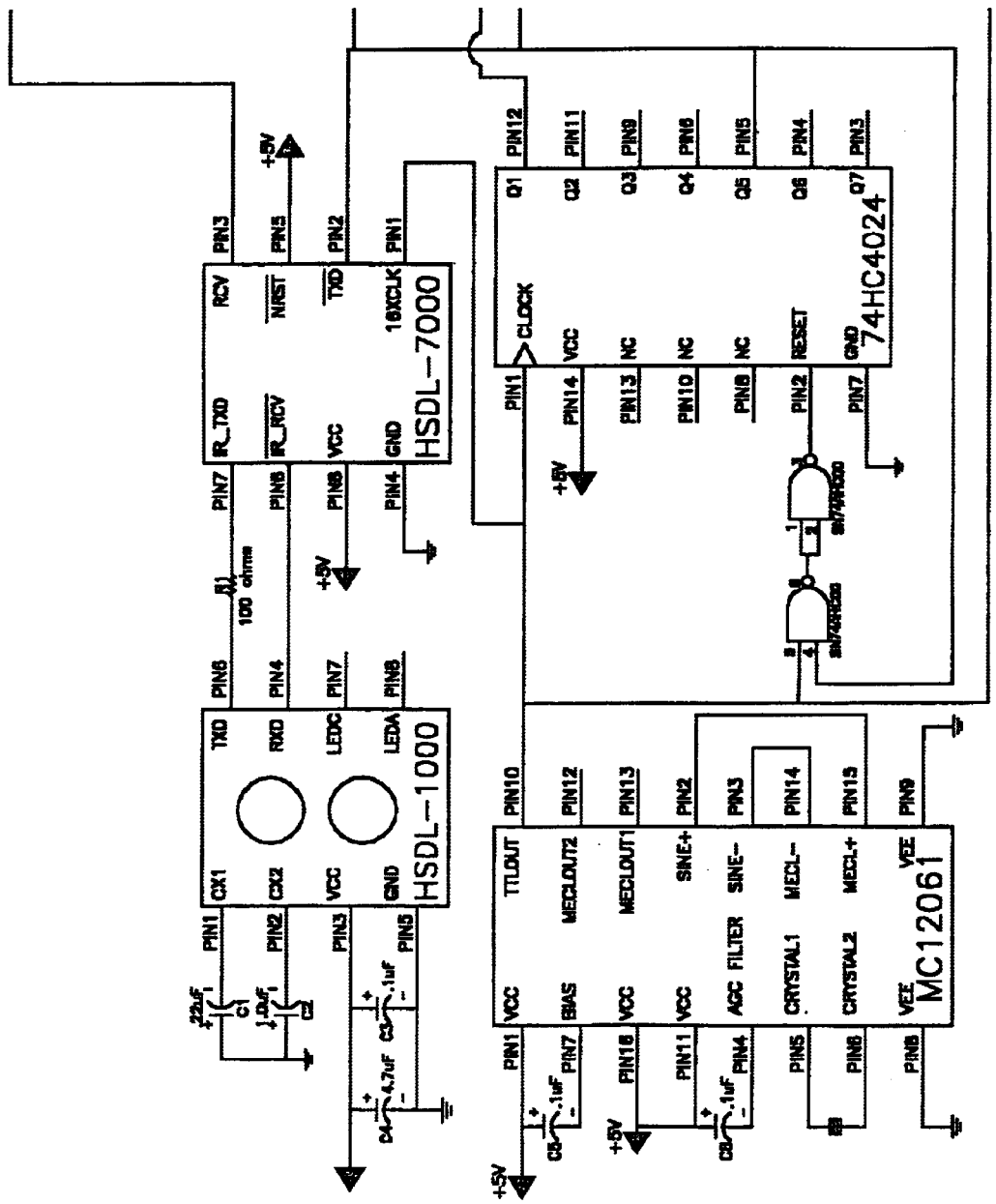
FIG. 3A is the left side of a schematic diagram of the present invention.
Figure 3B:
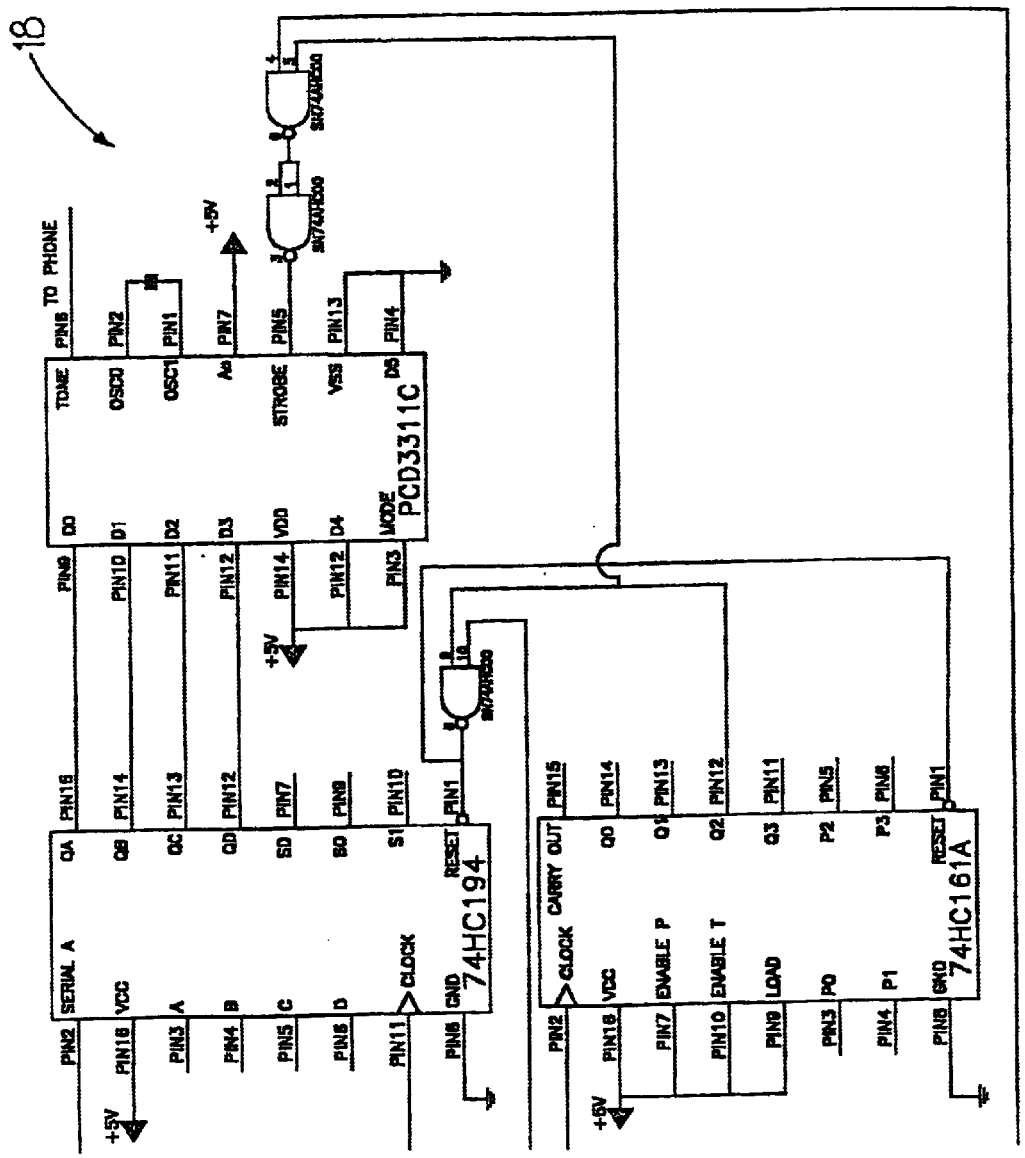
FIG. 3B is the right side of the same schematic diagram of the present invention

With reference now to the drawings, and in particular to FIGS. 1 through 3 thereof, a new telephonic automatic dialing sytem embodying the principles and concepts of the present invention and generally designated by the reference numeral 10 will be described.

The present invention, designated as numeral 10, includes a portable electronic organizer 12 having unillustrated memory for storing a plurality of telephone numbers therein. It should be understood for purposes of this specification and the claims that the organizer includes such computerized devices such as, for example, palmtop computers, person organizers, person digital assistants and even pagers. Such organizer is further equipped with an input device 14 such as keypad for selecting one of the telephone numbers. An unillustrated infrared transceiver is provided on the electronic organizer for transmitting digits of the selected telephone number via free space upon the receipt thereof. Further, the infrared transceiver is adapted to receive a prompting signal via free space for reasons that will soon become apparent. Connected between the memory, the input device, and the infrared transceiver, is control circuitry adapted to transmit the digits of the selected telephone number to the infrared transceiver sequentially one at a time only upon receipt of the prompting signal via the infrared transceiver.

As shown in FIG. 2, a telephone 16 is included which is adapted to dial digits of the selected telephone number upon the receipt thereof.

Finally, an interface 18 is provided including a housing 20 with adhesive 22 situated thereon for adhering to the telephone. The housing is further equipped with an input 24 for releasably connecting to a telephone line and an output 26 for releasably connecting to the telephone so as to allow the communication between the telephone line and the telephone. The interface further includes a plurality of components in the housing thereof which will be set forth hereinafter. It should be noted that in the alternative, the components may be situated within the telephone at time of manufacture.

The aforementioned components are shown in FIG. 3 and can be broken down into a number of different parts to show how the present invention operates. The interaction of these parts will then be explained to show how the total circuit operates.

The first part of the circuit to be looked at is the MC12061 Crystal Oscillator which is used to establish the clock input for the circuit. This clock will be used to control the timing of the circuit and to reset a number of devices in a controlled manner when certain conditions exist. The clock frequency can range from 2.0 Mega hertz to 20.0 Mega hertz depending on the crystal that is connected to pins 5 and 6. This crystal oscillator is capable of three different types of outputs; a sine wave output, a MECL compatible output and a TTL output. The chip was chosen because of its flexibility and the stability that can be obtained at the clock output. Each stage of the IC. has a separate Vcc connection for stability and to allow for filtering of any power supply noise. In this circuit two 0.1 UF capacitors are connected from Vcc (pins 1, 16, and 11) to the voltage regulator section (pin 7) and the sine wave generator (pin 4). Vcc in this circuit is +5 volts DC to be TTL compatible. The output of the sine wave generator (pins 2 and 3) are connected to the inputs (pin 14 and 15) of the sine to MECL generator. The output of this generator is internally connected to the MECL to TTL translator. Even though the IC. can be used to generate a variety of outputs it is not designed to operate simultaneously at TTL and MECL voltage levels. For this reason the VEE pins for the MECL section are grounded (pins 8 and 9). The clock output of the MC12061 Crystal Oscillator (pin 10) is sent to the 16XCLK input (pin 1) of the HSDL 7000 and the clock input of the 74HC4024 Seven Stage Binary Ripple Counter. The use of these signals are explained below. The clock output is also used in combination with other signals to reset the PCD3311C DTMF Tone Generator and the 74HC4024 Seven Stage Binary Ripple Counter as explained below.

Figure 4:
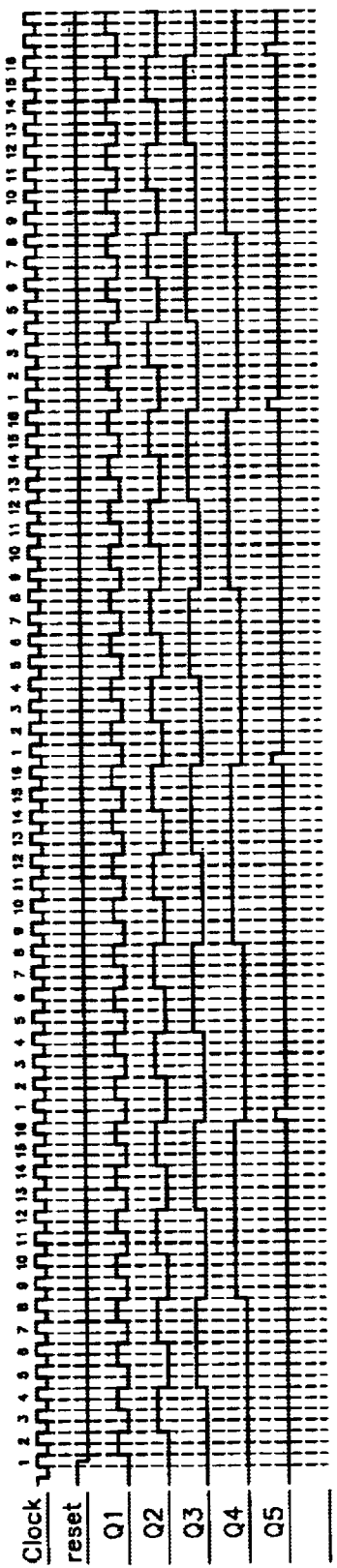
FIG. 4 is a timing diagram entitled: Resetting of the 74HC4024 Seven Stage Binary Ripple Counter. .

The 74HC4024 Seven Stage Binary Ripple Counter is used to divide the clock frequency into a number of different signals. The most important of these is the output obtained on Q5 of the 74HC4024 Seven Stage Binary Ripple Counter which takes the form of a "divide signal". This pin will go HIGH on the falling edge of the sixteenth clock input. The signal from Q5 of the 74HC4024 Seven Stage Binary Ripple Counter is inputted into the clocks of both the 74HC194 4-Bit Bi-directional Universal Shift Register and the 74HC161A Presettable Counter. The use of these signals will be explained later. The output of Q5 of the 74HC4024 Seven Stage Binary Ripple Counter is also ANDed with the clock signal obtained from pin 10 of the MC12061 Crystal Oscillator to reset the 74HC4024 Seven Stage Binary Ripple Counter. This is shown in the timing diagram illustrated in FIG. 4: Resetting of the 74HC4024 Seven Stage Binary Ripple Counter.

The HSDL 7000 is used to convert the IR signal(or digits) received at the HSDL 1000 into a "binary signal". It contains two parts, a serial IR encode and a serial IR decode. Both of these blocks derive their timing from the 16XCLK input signal. The HSDL 7000 is activated by the negative pulse from Q5 of the 74HC4024 Seven Stage Binary Ripple Counter. This indicates the end of a 16 bit clock cycle and that the next bit can be transferred by sending the "prompt signal" to the electronic organizer. When the HSDL 7000 receives this signal it sends a 3/16 modulated IR TXD signal which drives the IR transceiver module, HSDL 1000. When the data is steady the decoder is driven by a negative edge triggered signal on IR RCV from the RXD signal of the HSDL 1000. This signal is demodulated and stretched by the HSDL 7000 to send a stable signal to the input of the 74HC194 4-Bit Bi-directional Universal Shift Register. On the falling edge of Q5 of the 74HC4024 the date will be shifted right in the 74HC194 until a 4 bit binary word is formed. The count of four is obtained from the 74HC161A Presettable Counter (Q2 pin 12). This counter will increment by one for every positive pulse on Q5 of the 74HC4024. When a count of four is reached and thus the 74HC194 has a 4 bit number the signal is ANDed with the clock pulse to generate a "word signal" which strobes the data into the PCD3311C DTMF/Tone Generator to be sent to the phone line.

The output of bit 4, Q2 pin 12, of the 74HC161A is also NANDed with the output Q1 of the 74HC4024 to reset both the 74HC194 4-Bit Bi-directional Universal Shift Register and the 74HC161A Presettable Counter. This sets the circuit so that it is decoded the next IR pulse.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system for automatically dialing a number stored on a portable electronic organizer on a telephone, the system comprising:

a portable electronic organizer including:
   memory for storing a plurality of telephone numbers therein,
   an input device for selecting one of the telephone numbers stored in the memory,
   an infrared transceiver including means for transmitting digits of the selected telephone number via free space upon receipt of the digits, the infrared transceiver including means for receiving a prompting signal via free space, and
   control circuitry connected between the memory, the input device, and the infrared transceiver, the control circuitry including means for transmitting the digits of the selected telephone number to the infrared transceiver sequentially one at a time only upon receipt of the prompting signal via the infrared transceiver;

a telephone adapted to dial digits of the selected telephone number upon the receipt thereof; and an interface including a housing with adhesive situated thereon for adhering to the telephone, an input for releasably connecting to a telephone line, and an output for releasably connecting to the telephone so as to allow the communication between the telephone line and the telephone, the interface further comprising a plurality of components in the housing thereof including:
   an infrared transceiver including means for receiving the digits transmitted via the infrared transceiver of the electronic organizer, the infrared transceiver of the interface further including means for transmitting the prompt signal via free space upon the receipt of the prompt signal,
   an oscillator for generating a clock signal,
   a ripple counter connected to the oscillator for dividing the clock signal so as to a generate a divide signal which is high after a predetermined number of cycles of the clock signal,
   a converter connected to the oscillator, the ripple counter, and the infrared transceiver of the interface including means for converting each of the digits received via the infrared transceiver of the interface to a binary signal, wherein the binary signal comprises a 4-bit word, the converter further including means for transmitting the prompt signal to the infrared transceiver of the interface upon the receipt of the divide signal,
   a universal shift register connected to the ripple counter and the converter for receiving and storing the bits of each binary signal received from the converter, the universal shift register including means for transmitting the binary signal upon the receipt of a word signal, a presettable counter connected to the oscillator for generating the word signal upon a sufficient number of cycles of the clock signal occurring so as to indicate the receipt of all 4 bits of the binary signal by the universal shift register, and a dual tone multiple frequency tone generator connected to the universal shift register and the output of the interface for transmitting a tone associated with the digit represented by the binary signal received via the universal shift register, thereby transmitting the digit on the telephone for dialing purposes.

2. A system for automatically dialing a number stored in an electronic organizer on a telephone, the system comprising:

an electronic organizer including:
  memory for storing a plurality of telephone numbers therein,
  an input device for selecting one of the telephone numbers stored in the memory, and
  a communicator for transmitting digits of the selected telephone number;
telephone circuitry including means for dialing digits of the selected telephone number upon the receipt of the digits transmitted by the communicator;
an interface including a communicator in communication with the communicator of the electronic organizer for receiving the digits therefrom and transmitting the received digits to the telephone circuitry;
wherein the interface includes a shift register and a dual tone multiple frequency generator for generating a tone; and
wherein the communicators are infrared devices.

3. The system as set forth in claim 2 wherein the digits are communicated from the communicator of the electronic organizer to the communicator of the interface via free space.

4. The system as set forth in claim 2 wherein the communicator of the electronic organizer includes means for transmitting the digits only one at a time upon the receipt by the communicator of the electronic organizer of a prompt signal transmitted by the communicator of the interface.

5. The system as set forth in claim 2 wherein the interface includes a housing and means on the housing for mounting the housing to a telephone which contains the telephone circuitry.

6. The system as set forth in claim 2 wherein the interface includes a housing attached to a telephone which contains the telephone circuitry, the housing including an input for releasably connecting to a telephone line, and an output for releasably connecting to the telephone so as to allow the communication between the telephone line and the telephone.

7. The system as set forth in claim 2 wherein the digits are communicated from the communicator of the electronic organizer to the communicator of the interface via free space;
  wherein the communicator of the electronic organizer includes means for transmitting the digits only one at a time upon the receipt by the communicator of the electronic organizer of a prompt signal transmitted by the communicator of the interface; and
  wherein the interface includes a housing attached to a telephone which contains the telephone circuitry, the housing including an input for releasably connecting to a telephone line, and an output for releasably connecting to the telephone so as to allow the communication between the telephone line and the telephone.

* * * * *